United States Patent
Ekambaram et al.

(10) Patent No.: US 11,068,511 B2
(45) Date of Patent: Jul. 20, 2021

(54) AGGREGATE RELATIONSHIP GRAPH

(71) Applicant: International Business Machines Corporation, Armonk, NY (US)

(72) Inventors: Vijay Ekambaram, Chennai (IN); Ramasuri Narayanam, Bangalore (IN); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 256 days.

(21) Appl. No.: 15/937,591

(22) Filed: Mar. 27, 2018

(65) Prior Publication Data
US 2019/0303493 A1 Oct. 3, 2019

(51) Int. Cl.
*H04L 12/58* (2006.01)
*H04L 29/08* (2006.01)
(Continued)

(52) U.S. Cl.
CPC ...... *G06F 16/288* (2019.01); *G06F 16/24578* (2019.01); *G06F 16/9024* (2019.01);
(Continued)

(58) Field of Classification Search
CPC ... G06F 16/288; G06F 16/9024; H04L 67/22; H04L 51/16; H04L 51/32; G06Q 50/01
See application file for complete search history.

(56) References Cited

U.S. PATENT DOCUMENTS 5,951,621 A 9/1999 Palalau et al.
6,711,264 B1* 3/2004 Matsumoto ........... H04L 9/0891
380/277

(Continued)

FOREIGN PATENT DOCUMENTS

WO WO02063497 A1 8/2002
WO WO2017064548 A1 4/2017

OTHER PUBLICATIONS

Doniec et al., "Web of Friends—Discovering a Social Network by Mining Data from Instant Messengers," 2009 International Workshop on Social Informatics, IEEE Computer Society, 2009, pp. 16-22. (Year: 2009).*

(Continued)

*Primary Examiner* — Phuong Thao Cao
(74) *Attorney, Agent, or Firm* — Ference & Associates LLC (57) ABSTRACT

One embodiment provides a method, including: obtaining information related to a plurality of communication interactions between a first user and at least one other user, wherein each of the communication interactions is associated with a communication source and wherein the obtained information identifies a response by the first user to a received communication; constructing a plurality of relationship graphs for the user, wherein each relationship graph corresponds to one communication source and wherein each of the relationship graphs indicates (i) relationships between the first user and at least one other user and (ii) a condition of each of the relationships with respect to other relationships within the relationship graph; and constructing an aggregate relationship graph, wherein the constructing an aggregate relationship graph comprises computing an importance score for each relationship between the user and another user.

20 Claims, 3 Drawing Sheets

(51) Int. Cl.
*G06F 16/901* (2019.01)
*G06F 16/28* (2019.01)
*G06F 16/2457* (2019.01)

(52) U.S. Cl.
CPC .............. *H04L 51/16* (2013.01); *H04L 51/32* (2013.01); *H04L 67/22* (2013.01)

(56) References Cited

U.S. PATENT DOCUMENTS

| | | | |
|---|---|---|---|
| 7,373,389 B2 * | 5/2008 | Rosenbaum | G06F 16/9024 709/207 |
| 7,512,612 B1 * | 3/2009 | Akella | H04L 51/32 |
| 7,539,697 B1 * | 5/2009 | Akella | H04L 51/32 |
| 7,925,599 B2 | 4/2011 | Koren et al. | |
| 8,386,499 B2 * | 2/2013 | Martinez | G06F 16/337 707/755 |
| 8,838,581 B2 * | 9/2014 | Tseng | G06Q 30/00 707/721 |
| 8,892,651 B1 * | 11/2014 | Goldman | G06Q 50/01 709/204 |
| 8,943,053 B2 * | 1/2015 | Kristiansson | G06Q 10/10 707/732 |
| 8,954,500 B2 | 2/2015 | Marlow et al. | |
| 9,282,073 B1 * | 3/2016 | Avital | H04L 51/26 |
| 9,419,820 B1 * | 8/2016 | Liang | H04L 51/32 |
| 9,699,196 B1 * | 7/2017 | Kolman | G06F 16/285 |
| 9,720,099 B1 | 8/2017 | Ekambaram et al. | |
| 9,749,279 B2 | 8/2017 | Isaacs et al. | |
| 2004/0243679 A1 * | 12/2004 | Tyler | G06Q 10/107 709/206 |
| 2005/0283753 A1 * | 12/2005 | Ho | G06Q 10/10 717/102 |
| 2006/0031203 A1 * | 2/2006 | Rosenbaum | G06F 16/9024 |
| 2010/0082695 A1 * | 4/2010 | Hardt | G06F 16/972 707/798 |
| 2011/0231396 A1 * | 9/2011 | Dhara | H04L 47/70 707/731 |
| 2012/0047565 A1 | 2/2012 | Petersen | |
| 2012/0310612 A1 * | 12/2012 | Martinez | G06F 16/211 703/6 |
| 2013/0013913 A1 * | 1/2013 | Ge | G06F 21/62 713/153 |
| 2013/0031171 A1 | 1/2013 | Serena | |
| 2013/0046770 A1 * | 2/2013 | Tseng | G06F 16/9535 707/748 |
| 2013/0054706 A1 * | 2/2013 | Graham | H04L 51/32 709/206 |
| 2013/0097546 A1 * | 4/2013 | Gardenfors | H04L 51/16 715/772 |
| 2013/0297631 A1 * | 11/2013 | Castonguay | G06F 16/9024 707/758 |
| 2013/0297689 A1 * | 11/2013 | Bhat | G06F 40/30 709/204 |
| 2014/0108562 A1 * | 4/2014 | Panzer | H04L 51/32 709/206 |
| 2014/0143329 A1 * | 5/2014 | Garg | H04L 67/306 709/204 |
| 2014/0143332 A1 * | 5/2014 | Garg | G06N 5/022 709/204 |
| 2014/0250144 A1 * | 9/2014 | Guzenda | H04L 67/327 707/769 |
| 2014/0280582 A1 * | 9/2014 | Aylesworth | H04L 51/32 709/204 |
| 2014/0289259 A1 * | 9/2014 | Tamma | G06F 16/335 707/748 |
| 2014/0292765 A1 * | 10/2014 | Maruyama | G06T 11/206 345/440 |
| 2014/0359029 A1 * | 12/2014 | Jagadish | H04L 51/22 709/206 |
| 2015/0039424 A1 * | 2/2015 | Narravula | G06Q 30/0255 705/14.53 |
| 2015/0039889 A1 * | 2/2015 | Andoni | H04L 9/0825 713/170 |
| 2015/0046496 A1 * | 2/2015 | Karmarkar | G09B 7/00 707/798 |
| 2015/0100356 A1 | 4/2015 | Bessler et al. | |
| 2015/0248222 A1 * | 9/2015 | Stickler | G06Q 10/06 715/763 |
| 2015/0269267 A1 * | 9/2015 | Ekambaram | G06Q 50/01 707/751 |
| 2016/0036887 A1 * | 2/2016 | Ilic | H04L 67/22 709/206 |
| 2016/0117355 A1 * | 4/2016 | Krishnamurthy | H04L 67/22 707/749 |
| 2016/0124592 A1 * | 5/2016 | Kidron | H04L 51/24 715/752 |
| 2016/0321592 A1 * | 11/2016 | Zhou | G06Q 10/06393 |
| 2016/0344669 A1 * | 11/2016 | Bonham | H04L 51/12 |
| 2016/0350666 A1 * | 12/2016 | Andrews | H04L 67/306 |
| 2016/0352530 A1 * | 12/2016 | Andrews | H04L 12/185 |
| 2016/0366074 A1 * | 12/2016 | Bastide | H04L 51/32 |
| 2017/0039278 A1 * | 2/2017 | Marra | H04W 4/90 |
| 2017/0064527 A1 * | 3/2017 | Bohlander | H04W 4/90 |
| 2017/0118159 A1 * | 4/2017 | Ratiu | H04L 51/32 |
| 2017/0118303 A1 * | 4/2017 | Ratiu | G06Q 30/0244 |
| 2017/0169478 A1 | 6/2017 | Dey et al. | |
| 2017/0220677 A1 * | 8/2017 | Kazi | G06F 16/35 |
| 2017/0286565 A1 * | 10/2017 | Brave | G06Q 10/00 |
| 2017/0310625 A1 * | 10/2017 | Hu | H04L 51/26 |
| 2017/0324696 A1 * | 11/2017 | Akselrod | H04L 51/32 |
| 2018/0005121 A1 * | 1/2018 | Hoque | G06F 16/9024 |
| 2018/0083906 A1 * | 3/2018 | Jayaram | H04L 51/16 |
| 2018/0115510 A1 * | 4/2018 | Poveda | H04L 51/34 |
| 2018/0196812 A1 * | 7/2018 | Gupta | G06F 40/284 |
| 2018/0239767 A1 * | 8/2018 | Bostick | G06F 16/9024 |
| 2018/0239810 A1 * | 8/2018 | Pruitt | G06F 16/3328 |
| 2019/0050898 A1 * | 2/2019 | Sarraute | G06F 16/9038 |
| 2019/0087767 A1 * | 3/2019 | Lu | G06Q 10/063112 |
| 2019/0166224 A1 * | 5/2019 | Xiao | H04L 67/306 |
| 2019/0215289 A1 * | 7/2019 | Raskar | H04L 51/24 |

OTHER PUBLICATIONS

Stopczynski et al., "Measuring Large-Scale Social Networks with High Resolution," PLOS ONE, vol. 9, Issue 4, Apr. 2014, pp. 1-24. (Year: 2014).*

* cited by examiner

AGGREGATE RELATIONSHIP GRAPH

BACKGROUND

A relationship graph illustrates relationships between users or people. The relationship graph may not only identify the relationship association (e.g., friend, family, coworker, associate, peer, supervisor, etc.), but may also identify the closeness of the relationship (e.g., close, distant, known, acquaintance, etc.). A relationship graph may be generated from communication interactions that occur between two people or users. Using the communications, an entity can analyze the communications and determine, from the volume of communications and sentiment included within the communications, the relationship of the users. Upon performing this analysis on all communications between the user and other users, an entity can generate a relationship graph that identifies the relationships between the user and other users. Many entities use these relationship graphs and the analysis used to generate the relationship graphs to perform additional functions in relation to the identified relationships, for example, providing notifications of upcoming events corresponding to a close contact, enhancing the user experience with the entity, social network analysis, or the like.

BRIEF SUMMARY

In summary, one aspect of the invention provides a method, comprising: obtaining information related to a plurality of communication interactions between a first user and at least one other user, wherein each of the communication interactions is associated with a communication source and wherein the obtained information identifies a response by the first user to a received communication; constructing, from the obtained information and based upon the response by the first user, a plurality of relationship graphs for the first user, wherein each of the relationship graphs corresponds to a single communication source and wherein each of the relationship graphs indicates (i) relationships between the first user and at least one other user and (ii) a condition of each of the relationships with respect to other relationships within the relationship graph; and constructing an aggregate relationship graph for the first user, wherein the constructing an aggregate relationship graph comprises computing an importance score for each of the relationships between the first user and another user across the plurality of relationship graphs, wherein the calculated importance score identifies the importance of the relationship compared to other relationships within the aggregate relationship graph.

Another aspect of the invention provides an apparatus, comprising: at least one processor; and a computer readable storage medium having computer readable program code embodied therewith and executable by the at least one processor, the computer readable program code comprising: computer readable program code configured to obtain information related to a plurality of communication interactions between a first user and at least one other user, wherein each of the communication interactions is associated with a communication source and wherein the obtained information identifies a response by the first user to a received communication; computer readable program code configured to construct, from the obtained information and based upon the response by the first user, a plurality of relationship graphs for the first user, wherein each of the relationship graphs corresponds to a single communication source and wherein each of the relationship graphs indicates (i) relationships between the first user and at least one other user and (ii) a condition of each of the relationships with respect to other relationships within the relationship graph; and computer readable program code configured to construct an aggregate relationship graph for the first user, wherein the constructing an aggregate relationship graph comprises computing an importance score for each of the relationships between the first user and another user across the plurality of relationship graphs, wherein the calculated importance score identifies the importance of the relationship compared to other relationships within the aggregate relationship graph.

An additional aspect of the invention provides a computer program product, comprising: a computer readable storage medium having computer readable program code embodied therewith, the computer readable program code executable by a processor and comprising: computer readable program code configured to obtain information related to a plurality of communication interactions between a first user and at least one other user, wherein each of the communication interactions is associated with a communication source and wherein the obtained information identifies a response by the first user to a received communication; computer readable program code configured to construct, from the obtained information and based upon the response by the first user, a plurality of relationship graphs for the first user, wherein each of the relationship graphs corresponds to a single communication source and wherein each of the relationship graphs indicates (i) relationships between the first user and at least one other user and (ii) a condition of each of the relationships with respect to other relationships within the relationship graph; and computer readable program code configured to construct an aggregate relationship graph for the first user, wherein the constructing an aggregate relationship graph comprises computing an importance score for each of the relationships between the first user and another user across the plurality of relationship graphs, wherein the calculated importance score identifies the importance of the relationship compared to other relationships within the aggregate relationship graph.

A further aspect of the invention provides a method, comprising: obtaining a plurality of communication notifications, wherein each communication notification is associated with a communication source and wherein each communication notification corresponds to a communication between a user and another user; identifying an interaction of the user with respect to each of the plurality of communication notifications; determining, from the identified interaction, a relationship between the user and each of a plurality of other users, wherein the relationship identifies (i) a closeness of the user to another user and (ii) an association of the user to another user; constructing, from the determined relationships, a plurality of relationship graphs, each corresponding to one of the communication sources, wherein the identified closeness of the relationship is represented as edge weights in the relationship graph; calculating an importance score for each of the plurality of other users across the plurality of relationship graphs; and constructing, using the calculated importance scores, an aggregate relationship graph, wherein the aggregate relationship graph indicates a relationship of the user to another user identified across a plurality of communication sources.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Many entities or communication sources may generate relationship graphs. For example, a social media site may create and store relationship graphs for each user of the social media site. However, these relationship graphs are specific to the entity and do not include information from other communication sources (e.g., text messaging, phone conversations, social media sites, corporate sites, etc.). For example, one social media site may generate a relationship graph. However, the relationship graph is unique and specific to that social media site and does not reflect communications that occur outside of that social media site. In other words, each entity or communication source only has access to information or communications that occur using that entity or communication source.

Since each communication source only has access to communication interactions that occur within or using that communication source, the relationship graph generated by that communication source is incomplete. This incomplete information may provide an inaccurate representation of the relationships between users. On one hand, if a user communicates with another user equally across different communication sources, the relationship graph generated by a single communication source may be an accurate representation of the relationship association (e.g., family, friend, coworker, supervisor, etc.) and the closeness of the relationship (e.g., very close, acquaintance, distant, etc.). On the other hand, if the user communicates with another user more frequently using one communication source, or only using one communication source, a relationship graph generated by a different communication source may inaccurately represent the relationship association and the closeness of the relationship. For example, the communication source may identify the relationship association as family and the closeness as distant. However, the actual relationship may be a close family member, but most communications occur using a different communication source than the one generating the relationship graph.

Most entities are unwilling to share information with other entities because many of the entities are competitors. Even if some entities were willing to share information, not all entities would be willing to share information. Thus, the relationship graph would still be incomplete and inaccurate. There is not currently a method to generate a relationship graph that is an aggregate relationship graph across all communication sources. Since entities are unwilling to share information between entities, to capture all communication interactions, the entities have to access another source that includes all the communication interactions that occur regardless of the communication source.

Accordingly, an embodiment provides a system and method for generating an aggregate relationship graph across a plurality of communication sources. Rather than accessing each communication source individually, the system may access another source that provides details regarding the communication interactions. For example, the system may access a communication notification source that provides notifications regarding communication interactions that occur across any communication source. The system may extract information from the communication interactions that occur between the user and another user. The extracted information not only provides details regarding the text of the communication interaction, but may also be analyzed to determine a sentiment included in the communication interaction. Additionally, the information may provide details regarding the user's response within the communication interaction.

From the obtained information the system may construct a plurality of relationship graphs, each relationship graph corresponding to a different communication source. For example, a relationship graph will be constructed for each social media site, text messaging source, instant messaging source, and the like. The relationship graphs include nodes and edges, where the nodes represent a user and the edges represent a relationship that connect the user to another user. Thus, the relationship graph indicates relationships between the user and at least one other user and a condition of each relationship with respect to other relationships within the graph. In other words, the relationship graph indicates an association of the user to another user and also the closeness of the user to another user with respect to other users within the graph.

Once the plurality of relationship graphs are constructed, the system constructs an aggregate relationship graph that provides an overall picture of the relationships of the user across different communication sources. In other words, while each previously built relationship graph was specific and unique to a single communication source, the aggregate relationship graph illustrates the relationships of the user across all of the communication sources. To construct the aggregate relationship graph the system computes an importance score for each relationship across all communication sources. The importance score is then used to plot each relationship on the aggregate relationship graph. Thus, the system provides a relationship graph that is a more accurate representation of the health of each relationship of the user because it integrates information from all communication sources, rather than just a single communication source, as found in conventional techniques.

Such a system provides a technical improvement over current systems for relationship graph generation. The systems and methods as described herein provide a technique for generating an aggregate relationship graph that reflects the relationships of people across multiple communication sources, rather than just a single communication source. Rather than having incomplete and inaccurate information, as found in conventional techniques, the systems and methods as described herein provide a relationship graph that is complete and accurately reflects the relationship of people even when the communications occur across multiple communication sources. In other words, the systems and methods as described herein provide a technique that can identify all communications between users and can accurately compute and reflect the relationship that the users have with other users. Therefore, even if the users only communicate using a single communication source or communicate using multiple communication sources, the relationship graph will accurately reflect the relationship of the users to other users. Such an aggregate relationship graph is not possible using conventional techniques which only access communication interaction information from a single communication source and generate a relationship graph for that communication source.

Figure 1:
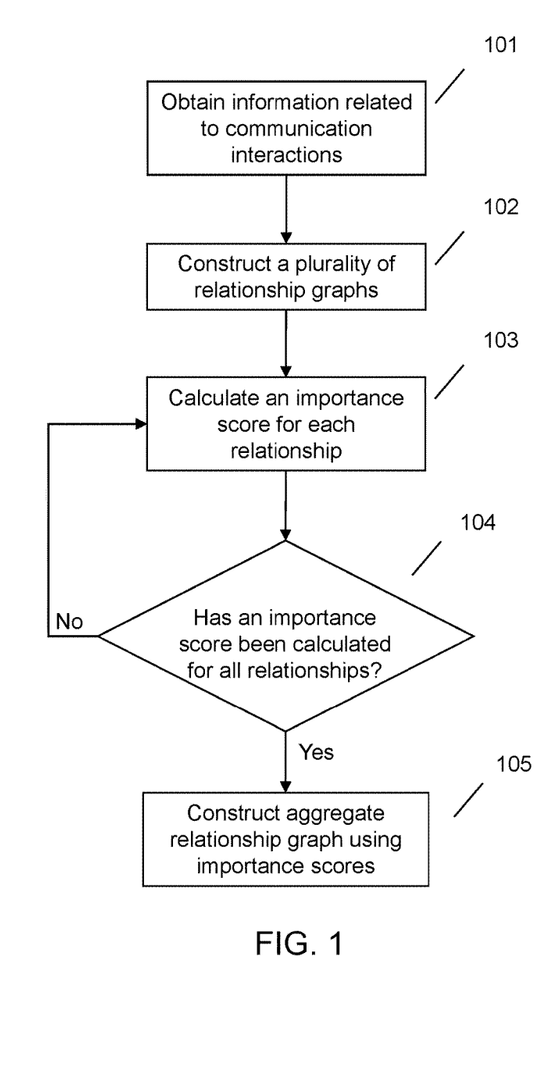
FIG. 1 illustrates a method of generating an aggregate relationship graph across a plurality of communication sources.

FIG. 1 illustrates a method for generating an aggregate relationship graph. At 101 the system may obtain information related to a plurality of communication interactions between a user and another user. The communication interaction may include any form of communication, for example, voice calls, text messages, instant messages, social media messages, voice mail messages, video conference calls, and the like. Audio based messages (e.g., voice calls, video conference calls, voice mail messages, etc.) may be converted to a text using an automatic speech recognition technique. A communication interaction may include receipt of a message or notification of a message from another user to the user, a message or notification of a message sent by the user to another user, or a combination thereof. In other words, a communication interaction may include any transmission of a message between a user and another user. Each communication interaction may be associated with a particular communication source. In other words, the communication interaction may be transmitted using a particular communication source. For example, a communication interaction may be associated with a social media site, text messaging application, instant messaging application, or the like. The system identifies the communication source that is associated with each communication interaction. The system also identifies the users that correspond to the communication interaction, for example, the user that the communication was sent from, the user that the communication was sent to, or the like.

To obtain the information related to the communication interactions the system may access each communication source. For example, the system may have access to text messaging applications, telephone call logs, social media sites, and the like. Additionally or alternatively, to obtain the information related to the communication interactions the system may access and extract information from notification messages. For example, a user may have a mobile device, wearable device, or the like, that receives notifications that a communication has been received. The system can use information extraction techniques, for example, text parsing, natural language processing, text extraction, metadata extraction, and the like, to extract information regarding the notifications and information included within the notifications. For example, the system may parse the communication included in the notification to identify the text included in the communication. These notifications may not only indicate that a communication was received, but may also identify the communication source of the communication, the users involved in the communication interaction, and at least a subset of the actual communication.

These notifications may be referred to as extended notifications, since they generally include not only information indicating that a message has been received or sent, but also include additional information included within the message itself. The notifications may occur whenever a user receives a communication, regardless of the communication source. In other words, a notification occurs whenever a communication occurs across any communication source, thereby giving the system access to all communications across all communication sources without having to directly access the communication source. Thus, even if the system cannot access all communication sources, the system is still able to identify a communication interaction and obtain information related to the interaction.

Communication notifications generally only occur when the user receives a communication. Thus, if the system is unable to directly access the communication source, the communication notification may only provide information regarding one side of the communication interaction, specifically the incoming communications. Thus, in the event that the system does not have direct access to the communication source, to capture information regarding the outgoing communications, for example, responses to the incoming communications, initiation of a communication interaction, or the like, the system may interact with other user's devices. For example, when the system detects an incoming communication, the system may encrypt the message, for example, using a public/private key encryption or other data encryption technique, and send it to the device or system of the user who sent the communication. The receiving device or system can then decrypt the communication and thereafter have access to the communication and information contained within the communication. Thus, the device for the target user will get these encrypted communications from the other user devices and will be able to generate a complete picture of the communication interaction.

The communication interactions can be analyzed to determine a response provided by the user within the communication interaction. For example, the communication interactions can be analyzed to identify how the user interacts with the notification information or within the communication interaction. As stated before, the system can use information extraction techniques to analyze the communication interaction. The extracted information can then be used to identify a sentiment included within the communication interaction, a response by the user, a priority given to the notification by the user, or the like. The system can then compute and assign an intra-importance score which indicates how the user interacts with respect to a particular notification, for example, whether the user responds quickly to the communication, what kind of response is provided by the user, and the like. The system may also compute and assign an inter-importance score which indicates how the user interacts to a communication or notification with respect to other communications or notifications. For example, the system may identify that when the user receives multiple notifications at the same time, or close to the same time, a message that the user responds to first or a message that the user appears to give a higher priority or importance. The analysis may identify different features, for example, the user's response time, the sentiment in the notifications or responses, the frequency of viewing or reading the notifications or communications, the amount of time spent reading the notification or communication, or the like.

From the obtained information, the system may construct a plurality of relationship graphs at 102. Each relationship graph corresponds to a single communication source. For example, a relationship graph will be constructed for each social media site, for each text messaging application, for each corporate communication channel, and the like. Each relationship graph includes the relationships between the user and other users within the corresponding communication source. To construct the relationship graph, the system uses the computed inter-importance and intra-importance scores that correspond to each other user within the relationship graph. Thus, the relationship graph also identifies a condition of each relationship with respect to other relationships within the relationship graph. The condition of the relationship may include an identification of the closeness of the relationship and an association of the other users with respect to the target user. Each relationship graph is updated as new information regarding communication interactions are received or identified. In other words, construction of the relationship graph is completed dynamically as new information is received.

Figure 2:
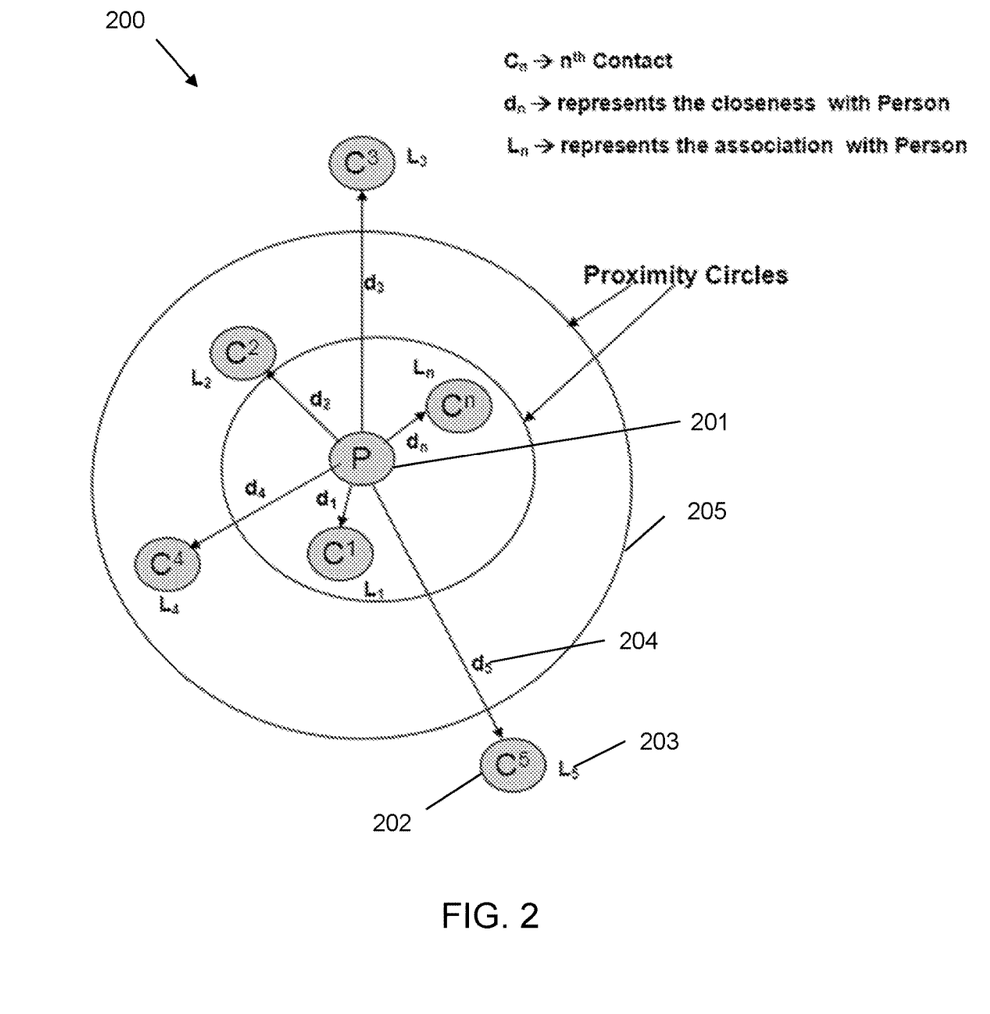
FIG. 2 illustrates an example relationship graph.

FIG. 2 illustrates an example relationship graph 200. The target user is shown at the center node 201. Each of the other nodes 202 represent other users who have a relationship with the target user 201. The edges between the nodes 201 and 202 illustrate that a relationship exists between the two users. The longer the edge the less close the relationship, as illustrated by the proximity circles 205. In other words, a short edge illustrates a close relationship, whereas a longer edge illustrates a relationship that is not as close. Thus, each edge includes a weight 204 representing the closeness of the other user 202 to the target user 201. This edge weight can be identified from the response time, sentiment, viewing frequency, length of time spent viewing the notification or communication, or the like. The nodes also have an associated association 203 that represents the association of the other user 202 to the target user 201. The association may describe the type of relationship that the user 202 has with the other user 202, for example, family, friend, co-worker, peer, supervisor, or the like. The information used to generate these graphs can be extracted from the information obtained at 101.

At 103 the system may then calculate an importance score for each relationship across the plurality of relationship graphs. In other words, the system is attempting to aggregate the information identified in each of the relationship graphs to generate the aggregate relationship graph. To calculate the importance score the system may first identify and resolve any node label ambiguities. In the relationship graphs, each node may have an associated label that identifies the other user associated with that node. Across different communication sources, the same user may have different names or labels. For example, a person may use a more formal name for professional communication sources and a nickname or less formal name for personal communication sources. Thus, the system must identify which nodes across the communication sources actually represent the same individual.

To identify user similarities, the system may use one or a variety of analysis techniques. For example, when a new sender name is identified within a communication, the system may compare this name to names already known. The system may then determine the hamming distance between the new name and the previously stored names. If the hamming distance indicates a similarity, the system may identify the new name as belonging to the same individual as the known name. The system may also use a Euclidean distance if the names are represented using vectors. Another technique may include comparing the names and determining a similarity between names. For example, the system could determine if two names have the same last name and then if the first names have a similarity. This may indicate one name is a nickname or shortened version of the other name. As another example, the system may determine if two names are spelled differently, but have the same basic structure or naming convention. Based upon the similarity assessment indicating that names are within a particular similarity threshold, the system may map the names to each other within the system. The system may also request input from the user to confirm that the names belong to the same individual.

Once any node label ambiguities have been resolved or any name associations have been made, the system may compute an importance score for each relationship across the plurality of relationship graphs. The system may compute the importance scores for all relationships across all the relationship graphs, or may only compute importance scores for relationships across a subset of the relationship graphs. For example, a user may only want to identify the importance of relationships across a particular subset of communication sources. The system and methods as described herein provide a mechanism for generating an aggregate relationship graph across all communication sources or for only the selected communication source subsets.

To compute the importance score, the system first assigns a probability distribution to each relationship over the neighboring relationships by normalizing the edge weights. In other words, the system assigns a probability distribution to each relationship based upon normalizing the edge weights within a range between 0 and 1. The system may also compute and assign a relative importance to the communication source. In other words, the system determines which communication sources are more important to the user as compared to the other communication sources. For example, based upon the information obtained at 101, the system may determine that the user assigns a higher importance or priority to a text messaging application than a social media site. The importance score for the communication source may also be computed using a probability distribution.

Once the probability distribution has been assigned to each relationship, the system may compare the probability distributions between two relationships or communication sources. The relative importance of the communication source can then be used to "weight" the relationships within that communication source, thereby weighting the importance scores for the relationships. For example, the system may compute an average distance over all the nodes in the network based upon the communication sources. The system may then cluster the relationship graphs based upon the computed distance, for example, using a spectral clustering technique, or other clustering technique. The system identifies the divergence between the probability distributions of the two relationships or communication sources, for example, using a Jensen-Shannon Divergence technique, or other divergence computation technique. The importance score is proportional to the divergence between the two relationships. In other words, the importance score can be derived based upon the probability distributions.

Alternatively, the importance scores assigned to the relationships can be used within an optimization problem. The system can then solve the optimization problem to determine the importance score for each relationship across the plurality of communication sources. For example, the system may normalize the importance scores computed and assigned to each relationship and then use these normalized importance scores in an optimization problem. After the system solves the optimization problem, the system can identify which relationships are more important than other relationships. The importance score, particularly as compared with the importance score computed and assigned to other relationships, then provides an indication of the closeness of the relationship.

The system then determines if importance scores have been calculated for all relationships at 104. If importance scores have not been calculated for all relationships, or the selected relationships, the system continues to calculate importance scores at 103. If, however, all importance scores have been calculated at 104, the system constructs an aggregate relationship graph using the importance scores at 105. The importance score acts as a weighting for each relationship. Thus, the system can use a weighted scheme to aggregate the weighted relationships or ranked relationships. For example, the system can generate an aggregated probability distribution to construct the aggregate relationship graph. In other words, the system generates a relationship graph, using the same or a similar technique as used in constructing the individual relationship graphs, using the weighted importance scores associated with the relationships. This aggregate relationship graph may also be dynamically updated as new notifications or communications are received or obtained.

The system may work across devices of a user. For example, a user may have different devices that are used to communicate with other users. Each device may therefore construct individual and/or aggregate relationship graphs based upon the information that is accessed or obtained by the device. Thus, the relationship graphs may be inaccurate if other communications occur on other devices. Accordingly, the system may share information across the devices. For example, when a device is within proximity to, directly connected to, or otherwise can communicate with another device, the devices may share information across the devices. The shared information can then be used to update the relationship graph(s) that are stored or generated by each of the devices.

The aggregate relationship graph provides information regarding the relationship health between a user and another user. Additionally, the aggregate relationship graph may provide a level of detail about the relationships, for example, the preferred communication source of a relationship, a level of frequency of communication, or the like. Using the aggregate relationship graph, the system or another system can perform different functions. For example, the system may provide automatic alerts (e.g., upcoming birthday, upcoming events of the other user, when the other user is in proximity to the user, etc.) regarding another user who is considered a close relationship. Additionally, the system may provide recommendations regarding communications with another user to either facilitate a closer relationship or to maintain a level of closeness. For example, the system may provide a recommendation that a user contact the other user because the two users have not communicated within a particular time frame.

As another example, if the system detects that a communication interaction has a high negative sentiment, the system may recommend a diversion to prevent escalation of the negativity. As a final example, the system may alert another user who is in proximity to a user when that user needs helps based upon a level of the relationship with the other user. In other words, if the user needs help, the system may identify a user who has a close relationship with the user and who is within a predetermined proximity of the user and provide a notification to that user that the user needs assistance.

Thus, the described systems and methods provide a technique for generating an aggregate relationship graph across a plurality of communication sources, as opposed to conventional techniques which, at best, only allow generation of a relationship graph for a single communication source. Thus, the systems and methods as described herein provide a technique that provides a more accurate and complete picture of relationships and a health of relationships of a user to other users.

Figure 3:
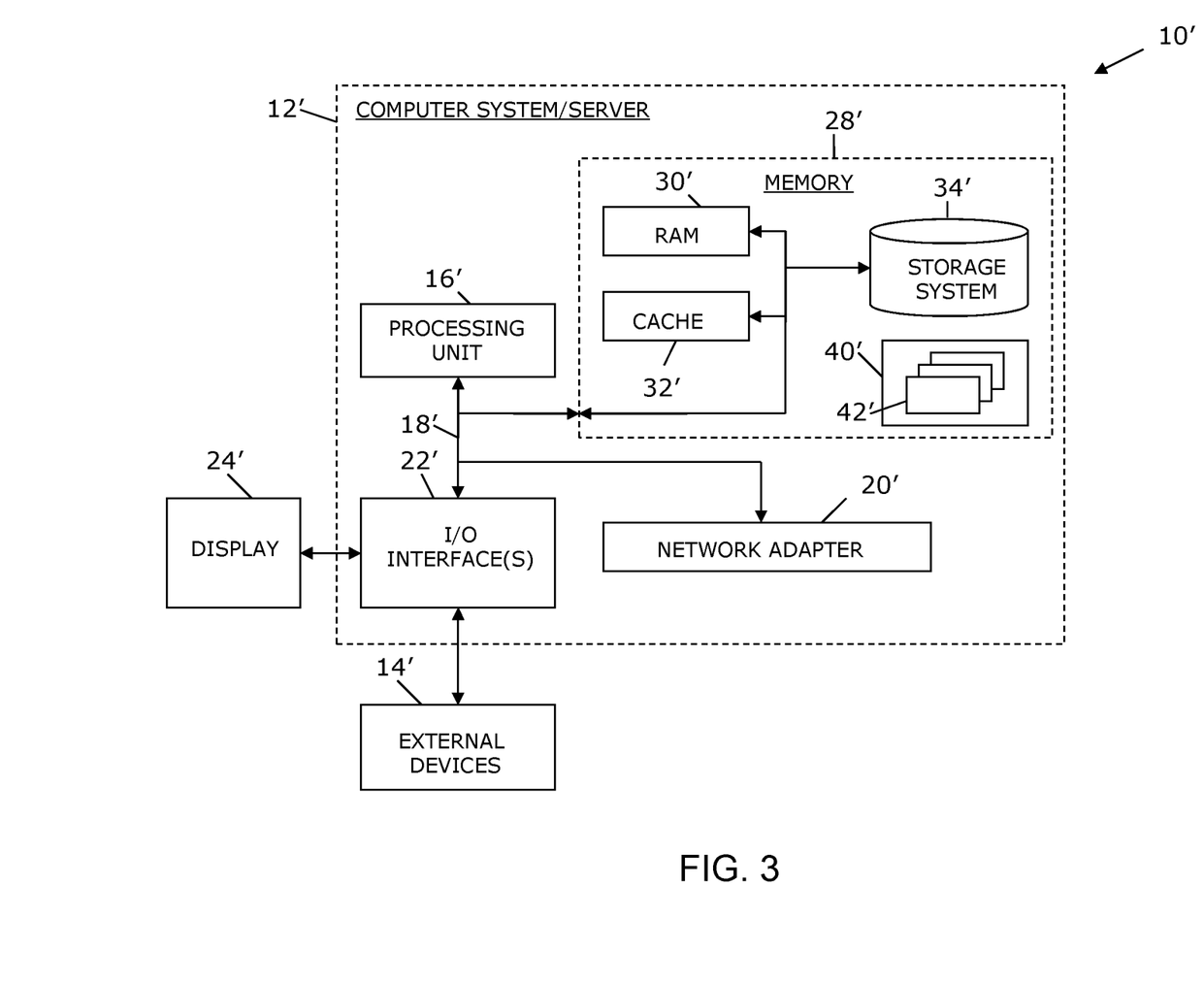
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
obtaining, using a processor, information related to a plurality of communication interactions between a first user and at least one other user, wherein each of the plurality of communication interactions is associated with a communication source, wherein the communication source comprises an application a communication interaction was provided within, wherein the obtained information identifies a response by the first user to a received communication, wherein at least a portion of the information is obtained from notifications indicating receipt of a communication interaction, the notifications being independent from a communication source of a given communication interaction corresponding to a given notification, wherein the notifications comprise information contained within the communication interactions, wherein identifying a response by the first user to a received communication comprises computing (i) an intra-importance score indicating how the first user interacts with respect to a given notification and (ii) an inter-importance score indicating how the first user interacts to the given notification with respect to other notifications;
constructing, using the processor and from the obtained information and based upon the response by the first user, a plurality of relationship graphs for the first user, wherein each of the relationship graphs corresponds to a single of a plurality of communication sources of the first user and wherein each of the relationship graphs indicates (i) relationships between the first user and at least one other user and (ii) a condition of each of the relationships with respect to other relationships within the relationship graph, wherein the condition of each of the relationships is identified based upon the intra-importance scores and the inter-importance scores of notifications corresponding to a given of the relationships; and
constructing, using the processor, an aggregate relationship graph for the first user from the plurality of relationship graphs, wherein the aggregate relationship graph comprises a single relationship graph encompassing all of the plurality of communication sources of the first user and identifying relationships between the first user and other users across all of the plurality of communication sources, wherein the constructing an aggregate relationship graph comprises computing an importance score for each of the relationships between the first user and another user across the plurality of relationship graphs, wherein the computed importance score identifies the importance of the relationship compared to other relationships within the aggregate relationship graph.

2. The method of claim 1, wherein the information related to a plurality of communication interactions comprises extended communication notifications.

3. The method of claim 1, wherein the obtaining information comprises receiving, from a device of another user, an encrypted communication message corresponding to a communication sent from the first user to the other user.

4. The method of claim 1, wherein data are extracted from the identified response by the first user and wherein the data comprise at least one of: a response time of the first user to a communication within the communication interaction, a sentiment of the first user within the communication interaction, a frequency of viewing of a communication within the communication interaction by the first user, and an amount of time spent by the first user viewing communications within the communication interaction.

5. The method of claim 1, wherein the computing an intra-importance score comprises assigning the computed intra-importance score to each of the communication interactions, wherein the intra-importance score identifies an importance of a communication to the first user.

6. The method of claim 1, wherein the computing an inter-importance score comprises assigning the computed inter-importance score to each of the communication interactions, wherein the inter-importance score identifies an importance of a communication with respect to other communications based upon correlation of timeliness of the response by the first user to the communication compared to a timeliness of the response by the first user to the other communications.

7. The method of claim 1, wherein the computing an importance score comprises deriving a probability distribution for each of the relationships within each of the relationship graphs based upon the weight of the edge corresponding to the relationship.

8. The method of claim 7, wherein the computing an importance score comprises identifying the statistical distance between two relationships of a relationship graph by computing the statistical distance between the probability distributions corresponding to each of the two relationships.

9. The method of claim 1, wherein each relationship graph is updated responsive to receiving information corresponding to a communication interaction.

10. The method of claim 1, wherein at least a subset of the plurality of relationship graphs are stored on different devices of a user, and wherein the plurality of relationship graphs are communicated to each of the different devices and updated based upon information received from another device.

11. An apparatus, comprising:
at least one processor; and
a non-transitory computer readable storage medium having computer readable program code embodied therewith and executable by the at least one processor, the computer readable program code comprising:
computer readable program code configured to obtain information related to a plurality of communication interactions between a first user and at least one other user, wherein each of the plurality of communication interactions is associated with a communication source, wherein the communication source comprises an application a communication interaction was provided within, wherein the obtained information identifies a response by the first user to a received communication, wherein at least a portion of the information is obtained from notifications indicating receipt of a communication interaction, the notifications being independent from a communication source of a given communication interaction corresponding to a given notification wherein the notifications comprise information contained within the communication interactions, wherein identifying a response by the first user to a received communication comprises computing (i) an intra-importance score indicating how the first user interacts with respect to a given notification and (ii) an inter-importance score indicating how the first user interacts to the given notification with respect to other notifications;

computer readable program code configured to construct, from the obtained information and based upon the response by the first user, a plurality of relationship graphs for the first user, wherein each of the relationship graphs corresponds to a single of a plurality of communication sources of the first user and wherein each of the relationship graphs indicates (i) relationships between the first user and at least one other user and (ii) a condition of each of the relationships with respect to other relationships within the relationship graph, wherein the condition of each of the relationships is identified based upon the intra-importance scores and the inter-importance scores of notifications corresponding to a given of the relationships; and computer readable program code configured to construct an aggregate relationship graph for the first user from the plurality of relationship graphs, wherein the aggregate relationship graph comprises a single relationship graph encompassing all of the plurality of communication sources of the first user and identifying relationships between the first user and other users across all of the plurality of communication sources, wherein the constructing an aggregate relationship graph comprises computing an importance score for each of the relationships between the first user and another user across the plurality of relationship graphs, wherein the computed importance score identifies the importance of the relationship compared to other relationships within the aggregate relationship graph.

12. A computer program product, comprising:
a non-transitory computer readable storage medium having computer readable program code embodied therewith, the computer readable program code executable by a processor and comprising:
computer readable program code configured to obtain information related to a plurality of communication interactions between a first user and at least one other user, wherein each of the plurality of communication interactions is associated with a communication source, wherein the communication source comprises an application a communication interaction was provided within, wherein the obtained information identifies a response b the first user to a received communication, wherein at least a portion of the information is obtained from notifications indicating receipt of a communication interaction, the notifications being independent from a communication source of a given communication interaction corresponding to a given notification, wherein the notifications comprise information contained within the communication interactions, wherein identifying a response by the first user to a received communication comprises computing (i) an intra-importance score indicating how the first user interacts with respect to a given notification and (ii) an inter-importance score indicating how the first user interacts to the given notification with respect to other notifications;

computer readable program code configured to construct from the obtained information and based upon the response by the first user, a plurality of relationship graphs for the first user, wherein each of the relationship graphs corresponds to a single of a plurality of communication sources of the first user and wherein each of the relationship graphs indicates (i) relationships between the first user and at least one other user and (ii) a condition of each of the relationships with respect to other relationships within the relationship graph, wherein the condition of each of the relationships is identified based upon the intra-importance scores and the inter-importance scores of notifications corresponding to a given of the relationships; and computer readable program code configured to construct an aggregate relationship graph for the first user from the plurality of relationship graphs, wherein the aggregate relationship graph comprises a single relationship graph encompassing all of the plurality of communication sources of the first user and identifying relationships between the first user and other users across all of the plurality of communication sources, wherein the constructing an aggregate relationship graph comprises computing an importance score for each of the relationships between the first user and another user across the plurality of relationship graphs, wherein the computed importance score identifies the importance of the relationship compared to other relationships within the aggregate relationship graph.

13. The computer program product of claim 12, wherein the obtaining information comprises receiving, from a device of another user, an encrypted communication message corresponding to a communication sent from the first user to the other user.

14. The computer program product of claim 12, wherein the computing an intra-importance score comprises assigning, the computed intra-importance score to each of the communication interactions, wherein the intra-importance score identifies an importance of a communication to the first user.

15. The computer program product of claim 12, wherein the computing an inter-importance score comprises assigning the computed inter-importance score to each of the communication interactions, wherein the inter-importance score identifies an importance of a communication with respect to other communications based upon correlation of timeliness of the response by the first user to the communication compared to a timeliness of the response by the first user to the other communications.

16. The computer program product of claim 12, wherein the computing an importance score comprises deriving a probability distribution for each of the relationships within each of the relationship graphs based upon the weight of the edge corresponding to the relationship.

17. The computer program product of claim 16, wherein the computing an importance score comprises identifying the statistical distance between two relationships of a relationship graph by computing the statistical distance between the probability distributions corresponding to each of the two relationships.

18. The computer program product of claim 12, wherein each relationship graph is updated responsive to receiving information corresponding to a communication interaction.

19. The computer program product of claim 12, wherein at least a subset of the plurality of relationship graphs are stored on different devices of a user and wherein the plurality of relationship graphs are communicated to each of the different devices and updated based upon information received from another device.

20. A method, comprising:

obtaining, using a processor, a plurality of communication notifications, wherein each of the plurality of communication notifications is associated with a communication source and wherein each of the communication notifications corresponds to a communication between a first user and another user, wherein the communication source comprises an application a communication was provided within, wherein at least a portion of the communication notifications comprises extended notifications indicating receipt of a communication, the extended notifications being independent from a communication source of a given communication corresponding to a given notification, wherein each of the plurality of communication notifications comprises information contained within the communication between a first user and another user;

identifying, using the processor, an interaction of the first user with respect to each of the plurality of communication notifications, wherein identifying an interaction of the first user comprises computing (i) an intra-importance score indicating how the first user interacts with respect to a given of the plurality of communication notifications and (ii) an inter-importance score indicating how the first user interacts to the given of the plurality of communication notifications with respect to others of the plurality of communication notifications;

determining, using the processor and from the identified interaction, a relationship between the first user and each of a plurality of other users, wherein the relationship identifies (i) a closeness of the first user to another user and (ii) an association of the first user to another user, wherein the closeness is identified based upon the intra-importance scores and the inter-importance scores of communication notifications corresponding to a given relationship;

constructing, using the processor and from the determined relationships, a plurality of relationship graphs for the first user, each of the plurality of relationship graphs corresponding to one of a plurality of communication sources, wherein the identified closeness of the relationship is represented as edge weights in the relationship graph;

calculating, using the processor, an importance score for each of the plurality of other users across the plurality of relationship graphs; and constructing, using the processor and using the calculated importance scores, an aggregate relationship graph for the first user and from the plurality of relationship graphs, wherein the aggregate relationship graph comprises a single relationship graph encompassing a plurality of communication sources of the first user and indicating a relationship of the first user to other users identified across the plurality of communication sources.

* * * * *